United States Patent
Hoshino

(10) Patent No.: US 6,967,704 B2
(45) Date of Patent: Nov. 22, 2005

(54) REFLECTIVE LIQUID CRYSTAL DISPLAY DEVICE INCLUDING ORGANIC FILM PREVENTED FROM BEING DEGRADED DUE TO MOISTURE ABSORPTION

(75) Inventor: Toshiaki Hoshino, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 102 days.

(21) Appl. No.: 10/670,925

(22) Filed: Sep. 25, 2003

(65) Prior Publication Data

US 2004/0056998 A1  Mar. 25, 2004

Related U.S. Application Data

(62) Division of application No. 09/953,670, filed on Sep. 17, 2001.

(30) Foreign Application Priority Data

| Sep. 18, 2000 | (JP) | ............................. 2000-282620 |
| Sep. 18, 2000 | (JP) | ............................. 2000-282621 |
| Sep. 18, 2000 | (JP) | ............................. 2000-282622 |

(51) Int. Cl.$^7$ .......................................... G02F 1/1339

(52) U.S. Cl. ...................... 349/153; 349/138; 349/113

(58) Field of Search ............................... 349/153, 138, 349/113, 106

(56) References Cited

U.S. PATENT DOCUMENTS

| 5,220,444 | A | | 6/1993 | Mitsui et al. |
| 5,684,551 | A | * | 11/1997 | Nakamura et al. ............. 349/99 |
| 5,739,880 | A | | 4/1998 | Akira et al. |
| 6,330,046 | B1 | * | 12/2001 | Ishitaka et al. ............. 349/138 |
| 6,597,421 | B1 | * | 7/2003 | Hatanaka et al. ........... 349/110 |

FOREIGN PATENT DOCUMENTS

| EP | 0 869 386 | 10/1998 |
| EP | 1 024 392 | 8/2000 |
| EP | 1 111 436 | 6/2001 |

* cited by examiner

*Primary Examiner*—Toan Ton
(74) *Attorney, Agent, or Firm*—Brinks Hofer Gilson & Lione

(57) ABSTRACT

A reflective liquid crystal display device having high reliability and excellent display is provided by preventing degradation and peeling of an organic film provided in order to impart an uneven shape to a reflective metal film. The reflective liquid crystal display has a configuration in which a liquid crystal layer is held in the space formed by a pair of substrates arranged opposing to each other and a seal member provided on the periphery portion of the substrate pair, an organic film, a reflective metal film, color filters, an overcoat film, an electrode substrate film, electrode layers, and an orientation film are laminated in order on the liquid crystal layer side of one substrate of the substrate pair, and the organic film is formed in the neighborhood region of the end of the seal member provided on the periphery portion of the aforementioned substrate.

5 Claims, 6 Drawing Sheets

REFLECTIVE LIQUID CRYSTAL DISPLAY DEVICE INCLUDING ORGANIC FILM PREVENTED FROM BEING DEGRADED DUE TO MOISTURE ABSORPTION

This application is a divisional application of currently pending U.S. application Ser. No. 09/953,670 filed on Sep. 17, 2001, entitled Reflective Liquid Crystal Display Device Including Organic Film Prevented From Being Degraded Due to Moisture Absorption.

BACKGROUND OF THE INVENTION

1. Field of the Invention

The present invention relates to a reflective liquid crystal display device having superior reliability.

2. Description of the Related Art

In recent years, reflective liquid crystal display devices having advantages in reduction of power consumption and thickness have been widely used as display devices for portable data terminals and handy type personal computers.

Hitherto, as the aforementioned reflective liquid crystal display device, an external reflective plate type display device, in which a reflective plate is provided on the outside of one substrate of a pair of substrates opposing to each other with a liquid crystal layer therebetween, has been known. However, regarding this reflective liquid crystal display device having the external reflective plate, there is a problem in that since a light incident from outside reaches the reflective plate through two substrates, display is likely to be darkened.

In order to reduce the number of substrates through which the light incident from outside reaches the reflective plate, a reflective liquid crystal display device, in which a reflective film is formed on one surface of one substrate of the aforementioned substrate pair, and this reflective film is included between the substrate pair, has been known.

However, regarding the aforementioned reflective liquid crystal display device having the built-in type reflective film, when the surface of the reflective film is mirror-finished, there has been a problem of reduction in contrast due to a reflected light which intensely occurs at a specified angle.

In order to solve the aforementioned problems, as shown in FIG. 6, a display device corresponding to the aforementioned reflective liquid crystal display device including a built-in reflective metal film with a surface having an uneven shape has been suggested.

FIG. 6 is a partial sectional structure diagram of the end portion of the aforementioned reflective liquid crystal display device.

In FIG. 6, a reflective liquid crystal display device 100 has a configuration in which a first substrate 110 and a second substrate 120 are opposed to each other, and a liquid crystal layer 130 is enclosed therebetween with a seal member 140.

On the liquid crystal layer 130 side of the first substrate 110, an organic film 111 provided with many bumps and dips, a reflective metal film 112, an overcoat film 114, a first electrode layer 115, and a first orientation film 116 are formed in order by lamination. On the liquid crystal layer side of the second substrate 120, second electrode layers 125, an overcoat film 126, and a second orientation film 127 are formed in order by lamination.

On the surface of opposite side of the liquid crystal layer 130 side of the second substrate 120, a phase difference plate 128 and a polarizing plate 129 are provided.

In the aforementioned reflective liquid crystal display device 100, since the reflective metal film 112 is built-in between the first substrate 110 and the second substrate 120, a light incident from the second substrate 120 side reaches the reflective metal film 112 through only the second substrate 120, and a reflected light returns to the outside of the second substrate 120 through only the second substrate as well. AS a consequence, loss of the light during passing through substrates can be reduced so as to achieve well-lighted display.

Since the reflective metal film 112 is formed on the organic film 111 with a surface having a shape of bumps and dips, the reflected light from the reflective metal film 112 is scattered, so that contrast and viewing angle property are improved.

Therefore, regarding the reflective liquid crystal display device 100 having the aforementioned configuration, well-lighted display and wide viewing angle can be achieved.

However, in the conventional reflective liquid crystal display device 100 having the aforementioned configuration, since the organic film 111 is formed so as to reach the outer end of the substrate 110, as shown in FIG. 6, the outer end face 111a of the organic film 111 contacts with the outside air.

This organic film 111 is composed of an ultraviolet curing acrylic resin, etc., and is likely to be degraded due to absorption of moisture. Consequently, when the outer end face 111a of the organic film 111 contacts with the outside air in a manner similar to that in the aforementioned reflective liquid crystal display device 100, the organic film 111 may be degraded due to absorption of moisture from the outer end face 111a, and the organic film 111 may peel off from the first substrate 110 or from the overcoat film 114, because moisture permeates into the joint end 110a of the organic film 111 and the first substrate 110, or into the joint end 114a of the organic film 111 and the overcoat film 114.

SUMMARY OF THE INVENTION

The present invention was made in order to solve the aforementioned problems. Accordingly, it is an object of the present invention to provide a reflective liquid crystal display device having high reliability by preventing degradation of an organic film due to absorption of moisture.

In order to achieve the aforementioned object, according to an aspect of the present invention, a reflective liquid crystal display, in which a liquid crystal layer is enclosed with a pair of substrates arranged opposing to each other and a seal member provided on the periphery portion of the substrate pair, at least an organic film, a reflective metal film, an overcoat film, an electrode layer, and an orientation film are laminated on the liquid crystal layer side of one substrate of the substrate pair, and the organic film is formed in the neighborhood region of the end of the seal member provided on the periphery portion of the substrates, is provided.

Accompanying this configuration, the distance between the outer end of the organic film formed on the liquid crystal layer side of one substrate and the outside can be increased, and as a consequence, degradation of the organic film due to permeation of moisture from the outside air can be prevented.

According to another aspect of the present invention, a reflective liquid crystal display, in which a liquid crystal layer is enclosed with a pair of substrates arranged opposing to each other and a seal member provided on the periphery portion of the substrate pair, at least an organic film, a reflective metal film, an overcoat film, an electrode layer and an orientation film are laminated on the liquid crystal layer side of one substrate of the substrate pair, and the organic film is formed in the region inside the end of the inner perimeter side of the seal member provided on the periphery portion of the substrates, is provided.

Accompanying this configuration, since the outer end of the organic film formed on the liquid crystal layer side of one substrate is arranged inside the seal member provided on the periphery portion of the substrate, the distance between the organic film and the outside can be increased, and as a consequence, degradation of the organic film due to permeation of moisture from the outside air can be prevented.

In the aforementioned reflective liquid crystal display device, the organic film is preferably formed in the region 0 mm to 5 mm inside the end of the inner perimeter side of the seal member provided on the periphery portion of the substrate.

Accompanying this configuration, degradation of the organic film due to moisture from the outside air reaching the organic film can be effectively prevented. In addition, since a display region of the liquid crystal display device can be increased, an efficient liquid crystal display device can be designed.

In the aforementioned liquid crystal display device, the end of the inner perimeter side of the seal member is preferably arranged outside an inclined portion formed on the surface of the electrode layer by the overcoat film surmounting the height difference formed between the organic film and the substrate.

Accompanying this configuration, since the seal member is arranged outside the aforementioned inclined portion, the seal member is arranged between the organic film and the outside air, and therefore, the seal member can also prevents moisture from permeating into the organic film.

In the aforementioned reflective liquid crystal display device, color filters are preferably formed on the aforementioned reflective metal film.

Accompanying this configuration, since color shift and parallax can be reduced, the liquid crystal display device having superior display quality can be provided.

According to another aspect of the present invention, a reflective liquid crystal display, in which a liquid crystal layer is enclosed with a pair of substrates arranged opposing to each other and a seal member provided on the periphery portion of the substrate pair, at least an organic film, a reflective metal film, an overcoat film, an electrode layer, and an orientation film are laminated to the liquid crystal layer side of one substrate of the substrate pair, and the end of the outer perimeter side of the organic film is arranged in the region outside the end of the outer perimeter side of the seal member provided on the periphery portion of the substrate, is provided.

Accompanying this configuration, since the seal member can be provided on a flat surface, the aforementioned pair of substrates can be held at a constant interval in the region enclosed with seal members, so that excellent display without unevenness in display can be achieved.

In the aforementioned reflective liquid crystal display device, the outer end of the organic film is preferably provided in the region 0.5 mm to 3 mm outside the end of the outer perimeter side of the seal member provided on the periphery portion of the substrate.

By arranging the organic film and the seal member in the aforementioned region, moisture in the outside air can be sufficiently interrupted, so that the organic film can be protected. Furthermore, a large display region can be ensured relative to the substrate.

According to another aspect of the present invention, a reflective liquid crystal display, in which a liquid crystal layer is enclosed with a pair of substrates arranged opposing to each other and a seal member provided on the periphery portion of the substrate pair, at least an organic film, a reflective metal film, an overcoat film, an electrode layer, and an orientation film are laminated in order on the liquid crystal layer side of one substrate of the substrate pair, and the end of the outer perimeter side of the organic film is arranged in the region inside the end of the outer perimeter side of the seal member provided on the periphery portion of the substrate, but outside the end of the inner perimeter side of the seal member, is provided in order to solve the aforementioned problem.

In the aforementioned reflective liquid crystal display device, the end of the inner perimeter side of the seal member provided on the periphery portion of the substrate is preferably arranged on a flat portion flattened by the overcoat film on the substrate, and the end of the outer perimeter side of the seal member is preferably arranged on an inclined portion formed by the overcoat film surmounting the end of the organic film on the substrate.

In the aforementioned reflective liquid crystal display device, the outer end of the organic film is preferably arranged in the region 0.3 mm to 0.8 mm inside the end of the outer perimeter side of the seal member.

Accompanying this, a constant cell gap can be formed by the inner perimeter side of the seal member and the organic film, and moisture in the outside air can be effectively separated by the outer perimeter side of the seal member.

Therefore, the reflective liquid crystal display device having superior display quality without unevenness in display, and having high reliability without degradation and peeling of the organic film can be provided.

In the aforementioned reflective liquid crystal display device, the overcoat film is preferably formed so as to cover the end face of the reflective metal film.

Accompanying this, the outside air and the organic film can be effectively separated.

In the aforementioned reflective liquid crystal display device, color filters are preferably directly formed on the reflective metal film.

Accompanying this, since color shift and parallax can be prevented, the reflective liquid crystal display device having superior display quality can be provided.

DESCRIPTION OF THE PREFERRED EMBODIMENTS

Embodiments according to the present invention will be explained below with reference to the drawings. However, the present invention is not limited to the following embodiments.

Figure 1:
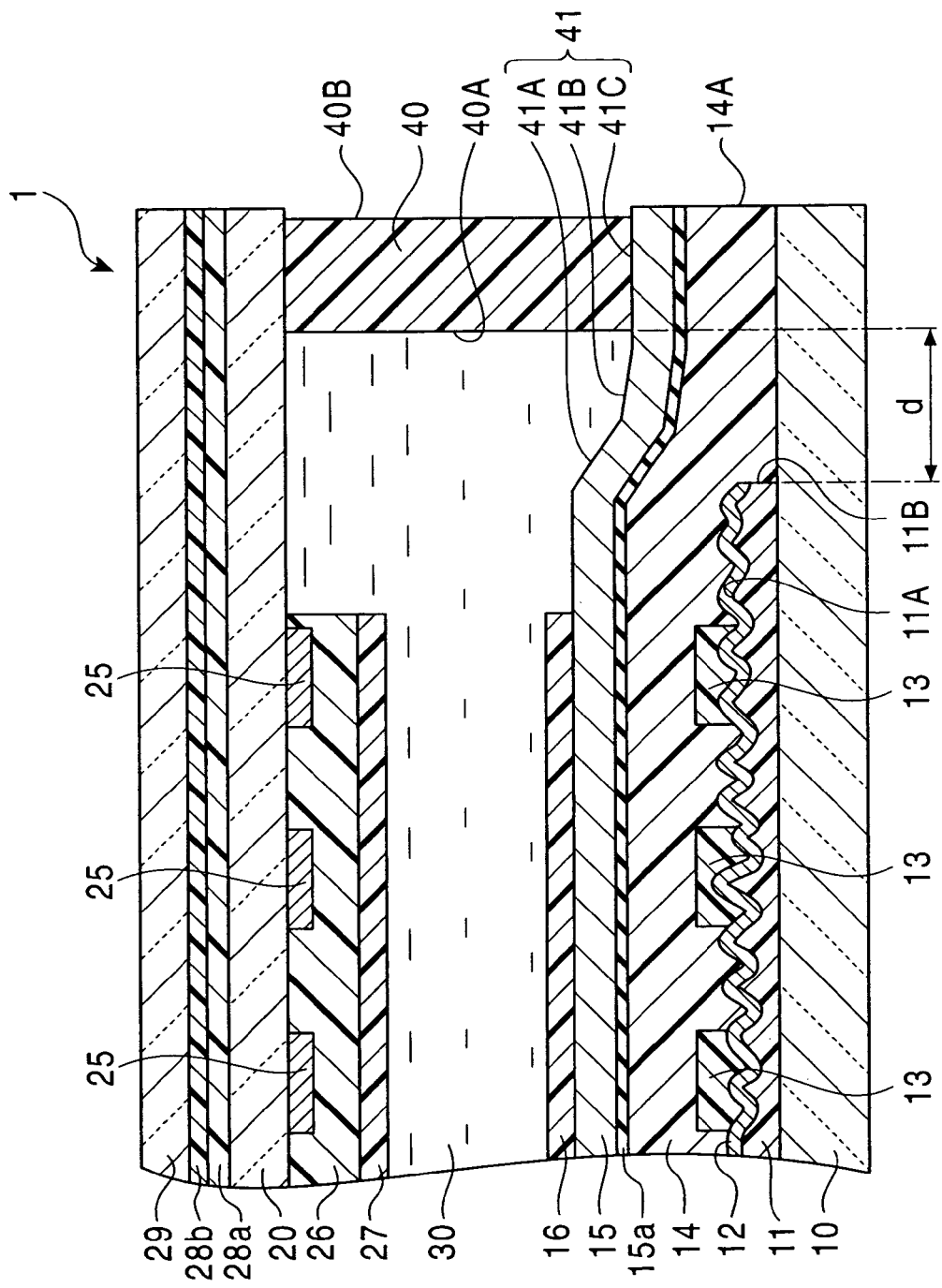
FIG. 1 is a partial sectional structure diagram of a reflective liquid crystal display device according to a first embodiment of the present invention.

FIG. 1 is a partial sectional structure diagram of a reflective liquid crystal display device 1 according to a first embodiment of the present invention.

The reflective liquid crystal display 1 as shown in FIG. 1 has a configuration in which a first substrate 10 and a second substrate 20 are opposed to each other, and a liquid crystal layer 30 is enclosed with these two substrates 10 and 20 and a seal member 40 provided on the periphery portion of the faces, opposing to each other, of the substrates 10 and 20. An organic film 11, a reflective metal film 12, color filters 13, an overcoat film 14, an electrode substrate film 15a, electrode layers 15, and an orientation film 16 are formed in order by lamination on the liquid crystal 30 side surface of the first substrate 10.

On the other hand, electrode layers 25, an overcoat film 26, and an orientation film 27 are formed in order by lamination on the liquid crystal layer 30 side surface of the second substrate 20, and on the opposite side (that is, on the outer surface of the second substrate 20), a first phase difference plate 28a, a second phase difference plate 28b, and a polarizing plate 29 are formed in order by lamination.

In the aforementioned structure, the region between the electrode layers 15 and the electrode layers 25 becomes the display region of the liquid crystal display device 1, and the region outside thereof becomes a non-display region.

As the first substrate 10 and the second substrate 20, transparent glass substrates are used preferably. However, when alkali contained in the glass substrate is eluted into the liquid crystal layer 30, the liquid crystal layer 30 is degraded so as to cause unevenness in color and faulty display. Therefore, it is preferable to use glass, for example, quartz glass and non-alkali glass, from which alkali is not eluted.

As the organic film 11, photosensitive resins, thermosetting resins, etc., are used, and the photosensitive resins, for example, acrylic resists, polystyrene resists, azide rubber resists, and imide resists, are used preferably.

Since many bumps and dips are formed on the surface 11A of the organic film 11, a light incident from the second substrate 20 side is reflected and scattered at the reflective metal film 12, so that the reflective liquid crystal display device 1 according to the present invention can exhibit excellent viewing angle property.

The film thickness of the organic film 11 is preferably within the range of 1 $\mu$m to 5 $\mu$m. When the film thickness is less than 1 $\mu$m, it is difficult to form desired bumps and dips on the organic film 11, and when the film thickness exceeds 5 $\mu$m, unevenness in film thickness is likely to occur. Furthermore, when the film thickness of the organic film 11 is increased, adhesion property between the organic film 11 and the first substrate 10 is reduced. Therefore, in order to ensure the adhesion property and make the structure being not likely to peel, the film thickness of the organic film 11 is more preferably within the range of 1 $\mu$m to 3 $\mu$m.

Figure 2:
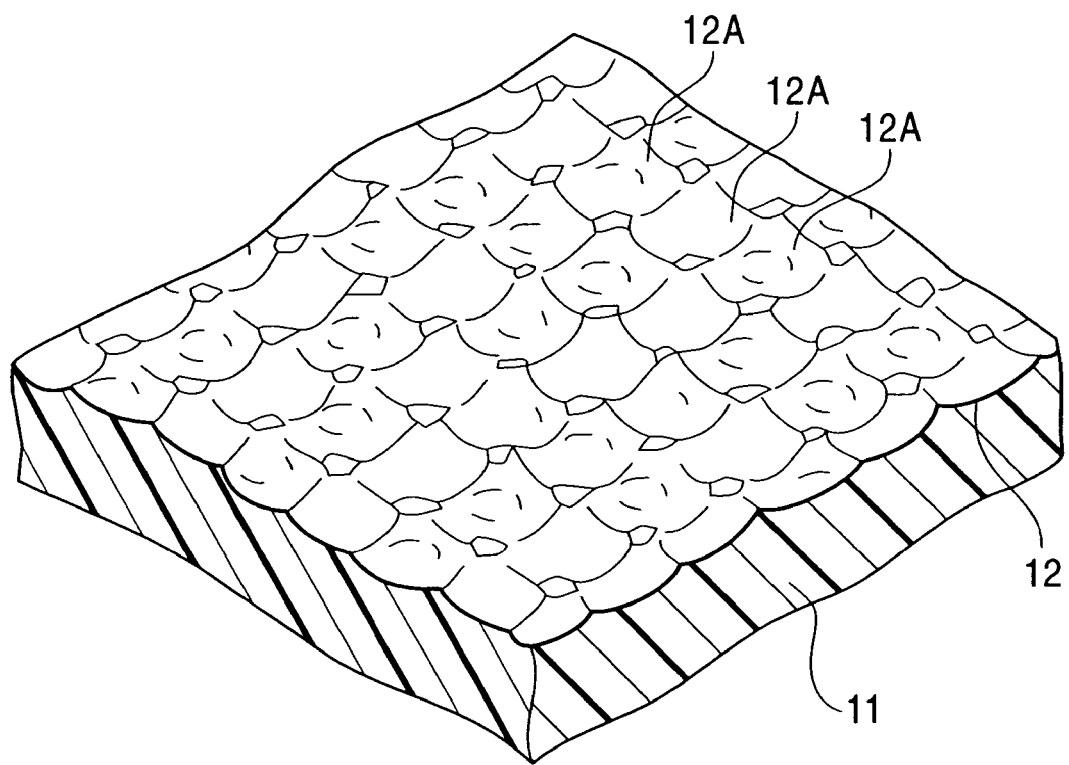
FIG. 2 is an enlarged perspective diagram of a part including an organic film and the surface of a reflective metal film.

FIG. 2 is an enlarged perspective diagram of a part including the organic film 11 and the reflective metal film 12. As is shown in the drawing, on the surface of the organic film 11, many concave portions 12A, inner face of which is a part of a sphere, are sequentially formed while overlapping each other, and on the face thereof, the reflective metal film 12 is laminated.

It is desirable that depths of the concave portions 12A are made to be random values within the range of 0.1 $\mu$m to 3 $\mu$m, the adjacent concave portions 12A are arranged while pitches therebetween are made to be random values within the range of 5 $\mu$m to 100 $\mu$m, and inclination angles of inner faces of the concave portions 12A are specified to be within the range of −18 degrees to 18 degrees.

In particular, it is important that the distribution of the inclination angles of inner faces of the concave portions 12A is specified to be within the range of −18 degrees to 18 degrees, and the adjacent concave portions 12A are arranged while pitches therebetween are made to be random values with respect to all directions of the plane. The reason for this is that if the pitches between the adjacent concave portions 12A have regularity, an interference color is generated so as to cause a problem of coloring of the reflected light. When the distribution of the inclination angles of inner faces of the concave portions 12A is out of the range of −18 degrees to 18 degrees, since scattering angle of the reflected light is excessively increased, reflection intensity is reduced and well-lighted display cannot be achieved (since the scattering angle of the reflected light becomes 36 degrees or more in air, the reflection intensity peak in the liquid crystal display device is reduced, and the total reflection loss is increased).

If depths of the concave portions 12A exceed 3 $\mu$m, when the concave portions 12A are flattened in a later step, the crests of the convex portions cannot be completely buried in the flattening film (overcoat film 14), so that desired flatness cannot be achieved.

When the pitches between the adjacent concave portions 12A are less than 5 $\mu$m, since there is manufacturing constraint of a transfer mold used for forming the organic film 11, problems occur in that processing time is increased by a large degree, a shape sufficient for achieving desired reflection property cannot be formed, a coherent light is generated, etc. In practice, when a diamond indenter of 30 $\mu$m to 200 $\mu$m in diameter usable for manufacturing the aforementioned transfer mold is used, the pitches between the adjacent concave portions 12A are preferably 5 $\mu$m to 100 $\mu$m.

Next, an embodiment of a method for forming the organic film 11 will be briefly explained with reference to FIG. 3.

Figure 3:
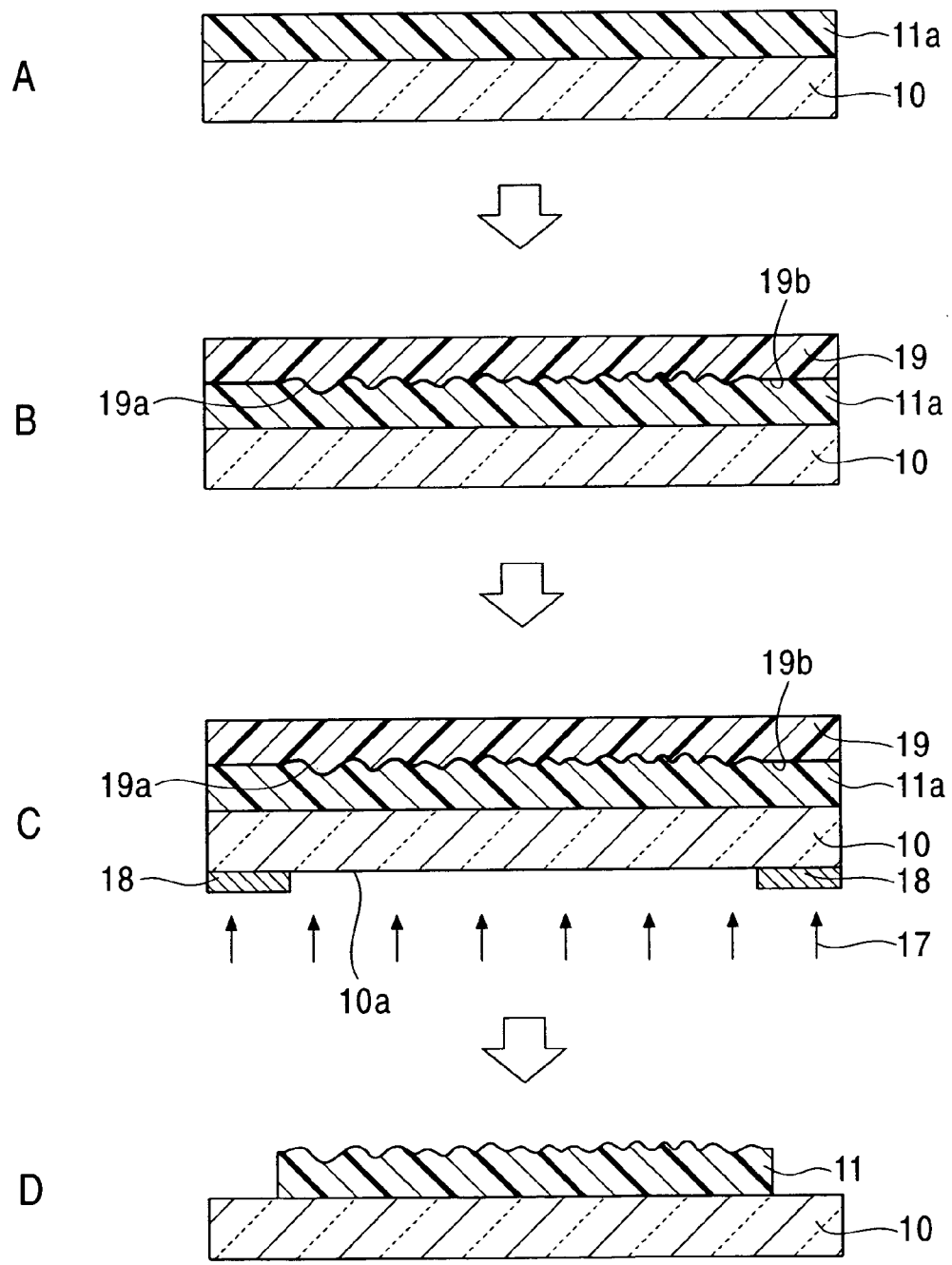
FIG. 3 is a diagram showing an embodiment of a process for forming an organic film in a reflective liquid crystal display device according to the present invention with reference to the sectional configurations.

FIG. 3 is a diagram schematically showing a process for forming the organic film 11 in a reflective liquid crystal display device according to the present embodiment as shown in FIG. 1 with reference to the sectional configurations at steps A to D. The steps A to D are in the order in which the steps are performed.

In the step A, a coating of a photosensitive resin solution, for example, an acrylic resist, is applied on the first substrate 10 by a spin coat method, etc., and thereafter, pre-bake is performed so as to form a photosensitive resin layer 11a.

In the step B, a transfer mold 19 provided with a surface composed of an uneven surface 19a having a shape of bumps and dips and a flat surface 19b at the periphery portion of the uneven surface 19a is pressed against the surface of the photosensitive resin layer 11a so as to transfer the shape of the uneven surface 19a of the transfer mold 19 to the surface of the photosensitive resin layer 11a.

In the step C, on the reverse surface 1a side of the surface, on which the photosensitive resin layer 11a has been formed, of the first substrate 10, portions corresponding to the flat surface 19b at the periphery portion of the transfer mold 19 are covered with photomasks 18. Subsequently, a light 17, for example, an ultraviolet ray (g, h, and i-ray), is irradiated from the reverse surface 10a side of the first substrate so as to cure the photosensitive resin layer 11a.

In the step D, the photomasks 18 are removed from the first substrate 10, and the transfer mold 19 is removed from the photosensitive resin layer 11a. At this time, in the photosensitive resin layer 11a, since the portions corresponding to the flat portion 19b of the transfer mold 19 are not cured due to masking by the photomasks 18, these portions are removed together with the transfer mold 19 during the removal of the transfer mold 19.

Thereafter, development and pure water rinse are performed, and then, baking is performed with a heating device, for example, furnaces and hot plates.

By the aforementioned operations, the organic film 11 with the surface having a shape of bumps and dips is formed in the predetermined region on the first substrate 10.

As described above, by forming the organic film 11 on the region other than the periphery portion of the substrate 10, the organic film 11 including the end portion thereof can be covered with the overcoat film 14 which is formed later. Accompanying this, the organic film 11 is prevented from contacting with the outside air, so that degradation of the organic film 11 due to moisture can be prevented.

The reflective metal film 12 is provided in order to reflect and scatter the light incident into the liquid crystal layer 30 to achieve well-lighted display, and is formed on the surface having a shape of bumps and dips of the organic film 11.

Regarding the reflective metal film 12, metallic materials having high reflectance, for example, Al and Ag, are used preferably, and the reflective metal film 12 can be formed from these metallic materials by a film forming method, for example, sputtering and vacuum evaporation.

Since the aforementioned metallic materials, for example, Al and Ag, do not always have excellent adhesion properties to the substrate 10 made of glass, when a part of this reflective metal film 12 is formed between the overcoat film 14 and the substrate 10, peeling of the film may be occurred.

Therefore, when the reflective metal film 12 is formed, it is preferable that the periphery portion of the substrate 10, on which the organic film 11 has not been formed, is covered with a mask member, and after the film is formed, removal treatment of the mask member is performed so as not to form a film of the aforementioned metallic material on the first substrate 10.

When the thickness of the reflective metal film 12 is excessively reduced, since coverage factor of the surface of the organic film 11 is reduced, the reflectance is reduced, and therefore, display is darkened. When excessively increased, peeling is likely to occur due to stress of the reflective metal film 12 itself, and in addition to this, film formation time of the reflective metal film 12 is increased and productivity is reduced. Therefore, the thickness of the reflective metal film 12 is preferably 200 to 2,000 angstroms, and more preferably, is 500 to 1,500 angstroms.

On the reflective metal film 12, color filters 13 for displaying each of colors of red, green, and blue are formed at intervals of about 10 μm. The color filters 13 are formed by, for example, coating the reflective metal film 12 with a resin, in which pigment is dispersed, and performing the steps of exposing and developing for each of the colors.

As described above, since unevenness in color and parallax of the liquid crystal display device can be prevented by formation of the color filters 13 immediately above the reflective metal film 12, high quality display can be achieved.

The film thickness of the color filter 13 is preferably 0.3 μm to 1.5 μm. When the film thickness is less than 0.3 μm, purity of the color is reduced, and reproducibility of the color is reduced. When the film thickness exceeds 1.5 μm, the transmission factor of the color filter 13 is reduced so as to darken the display.

On the color filters 13, the overcoat film 14 covering the color filters 13, the organic film 11, and the substrate 10 is formed in order to flatten the bumps and dips of the organic film 11, the color filters 13, etc., formed on the substrate 10.

The overcoat film 14 is provided in order to improve the reliability of the liquid crystal display device by flattening the formed film surface to keep the interval between the first substrate 10 and the second substrate 20 constant and to prevent unevenness in display, and by separating the organic film 11 from the outside air to prevent moisture from permeating into the organic film 11.

The overcoat film 14 is preferably formed so as to cover at least an outer end portion 11B of the organic film 11. Accompanying this configuration, the organic film 11 can be prevented from directly contacting with the outside air, and as a consequence, degradation of the organic film 11 can be prevented.

Acrylic thermosetting resin, etc., are used for the overcoat film 14, and in particular, resins having low hygroscopicity and low moisture permeability are preferably used.

The film thickness of the overcoat film 14 is preferably within the range of 1.5 μm to 5 μm. This is because when the film thickness is less than 1.5 μm, the bumps and dips of the surface due to the reflective metal film 12 and the color filters 13 cannot be sufficiently flattened, so that unevenness in display is likely to occur, and when the film thickness exceeds 5 μm, unevenness in film thickness of the overcoat film 14 and peeling are likely to occur.

Furthermore, in order to reduce the rate of rejection, due to faulty display and insufficient adhesion to adjacently formed films, to sufficiently low level, the film thickness of the overcoat film 14 is more preferably 2 μm to 3 μm.

The electrode layers 15 are formed by arranging many electrodes having a slip-like shape, in plan view, made of transparent conductive film, for example, ITO (Indium Tin Oxide), on the electrode substrate film 15a made of $SiO_2$, etc., formed on the overcoat film 14. These electrode layers 15 are provided as electrodes for driving the liquid crystal layer 30 by being connected to external driving circuits, although not shown in the drawing.

The electrode layers 25 are also formed by arranging many transparent electrodes having a slip-like shape, in plan view, and are connected to respective external driving circuits, in a manner similar to those in the electrode layers 15. The electrode layers 15 and the electrode layers 25 are arranged in directions perpendicular to each other, in plan view, so that the reflective liquid crystal display device is made to be passive matrix type.

On the electrode layers 25 of the second substrate 20, in order to flatten the formed film surface and to keep the interval between the substrates 10 and 20 constituting the liquid crystal display device 1 constant, the overcoat film 26 covering the electrode layers 25 is formed.

As the material constituting the overcoat film 26, silicone resins, etc., are used preferably.

On the liquid crystal layer 30 side of the electrode layers 15 of the first substrate 10 and the overcoat film 26 of the second substrate 20, the orientation films 16 and 27 are formed, respectively.

The orientation films 16 and 27 are provided in order to control orientation of liquid crystal molecules constituting the liquid crystal layer 30. An organic film made of polyimide resin, etc., subjected to surface rubbing treatment, etc., after formation of the film, is used as the orientation film.

When the film thicknesses of the orientation films 16 and 27 are excessively reduced, these cannot endure the load during the rubbing treatment, and when excessively increased, propagation loss of light is increased, so that display is darkened. Therefore, the film thicknesses are preferably 100 to 1,000 angstroms, and more preferably, are 500 to 800 angstroms.

Since the orientation films 16 and 27 contact with the liquid crystal layer 30, it is preferable that ion elution therefrom into the liquid crystal layer 30, etc., does not occur.

On the side opposite to the liquid crystal layer 30 side of the second substrate 20, that is, on the outer surface side of the substrate 20, the first phase difference plate 28a and the second phase difference plate 28b are provided in order. As these phase difference plates 28a and 28b, in general, a stretched macromolecular material, for example, polycarbonate, is used, although the optimum combination of materials, film thicknesses, etc., of the two phase difference plates 28a and 28b for electro-optical properties of the liquid crystal display device is chosen.

In the case where at least two phase difference plates are laminated as in the reflective liquid crystal display device 1 according to the present invention, since wavelength dispersion property can be controlled with some degree of flexibility, it is possible to efficiently design increase in viewing angle and improvement of contrast.

On the second phase difference plate 28b, the polarizing plate 29 is provided in order to control polarization of the light incident into the liquid crystal layer 30 or the return light reflected by the reflective metal film 12. Since the polarizing plate 29 is located at the outermost surface in the reflective liquid crystal display device 1, in order to prevent the reduction of contrast due to the reflection by the surface, the polarization plate which has been subjected to antiglare treatment, non-reflection treatment, etc., is used preferably.

The seal member 40 is provided in the shape of a ring, in plan view, on the periphery portion of the first substrate 10 and the second substrate 20 and adheres both substrates in order to hold the liquid crystal layer 30 between both substrates. The seal member 40 is formed by the steps of printing the periphery portion of the substrate 10 or substrate 20 with a solution of a thermosetting resin or an ultraviolet curing resin, pressure-bonding both substrates at a predetermined location, and thereafter, performing heat treatment or ultraviolet ray irradiation treatment so as to cure. Furthermore, since the seal member 40 directly contacts with the liquid crystal layer 30, it is preferable that ion elution therefrom into the liquid crystal layer 30, etc., does not occur.

In the reflective liquid crystal display device 1 having the aforementioned configuration, regarding the relationship between locations of the seal member 40 and the organic film 11, which is a feature of the present invention, the outer end portion 11B of the organic film 11 is arranged in the neighborhood region, for example, in the region inside the end portion 40A of the inner perimeter side of the seal member 40 by a distance d as shown in FIG. 1. The reason for the aforementioned arrangement of the seal member 40 is as described below.

Since the organic film 11 degrades and peels due to absorption of moisture, the aforementioned overcoat film 14 covering the outer end portion 11B of the organic film 11 is formed, and a material, which is not likely to absorb and transmit moisture, is used for the overcoat film 14.

However, since the material of the overcoat film 14 is also an acrylic resin, some degree of absorption and transmittance of moisture are inevitable. Therefore, when the location of the outer end portion 11B of the organic film 11 is near to the outside air (that is, near to the end of the substrate 10), moisture absorbed and transmitted by the overcoat film 14 may reach the organic film 11 so as to cause peeling.

On the other hand, by arranging the outer end portion 11B of the organic film 11 to be inside the end portion 40A of the inner perimeter side of the seal member 40 as in the reflective liquid crystal display device 1 according to the present invention as shown in FIG. 1, the configuration, in which the overcoat film 14, the liquid crystal layer 30, and the seal member 40 are laminated above the organic film 11 as shown in FIG. 1, is provided.

As a consequence, there is no fear of moisture permeation from above side of the organic film 11, and the outer end portion 14A of the overcoat film 14 is only one inlet of the moisture permeation from the outside air. With respect to this as well, since the region for providing the seal member is ensured between the outer end portion 11B of the organic film 11 and the outer end portion 14A of the overcoat film 14, the distance until the organic film 11 is long, so that moisture permeating from the outer end portion 14A of the overcoat 14 does not reach the organic film 11.

As described above, improvement of the reliability of the reflective liquid crystal display device 1 according to the present invention is realized by separating the organic film 11 from the outside air so as to prevent permeation of moisture into the organic film 11 and to prevent peeling of the organic film 11.

Regarding the distance d between the outer end portion 11B of the organic film 11 and the end portion 40A of the inner perimeter side of the seal member 40, when it is excessively reduced, moisture permeates into the organic film 11 with a result that the organic film 11 becomes likely to peel off from the substrate 10, and when it is excessively increased, a display region becomes small relative to the size of the substrate. Therefore, the distance d is preferably within the range of 0 to 5 mm, and more preferably is within the range of 0 to 1.5 mm in order to ensure the larger display region.

The region from the position, which is in the neighborhood of the outer end of the electrode layers 15, and corresponds to the outer end portion 11B of the organic film 11, to the outer end of the electrode layers 15 has a shape inclined toward the outer end side of the substrate 10 due to a height difference between the organic film 11 formed on the substrate 10 except for the periphery portion thereof and the substrate 10. This inclined portion 41 can be divided into three regions, that is, in the order from the inside, a first inclined portion 41A having the largest inclination angle, a second inclined portion 41B having an inclination angle smaller than that of the first inclined portion 41A, and a flat portion 41C which is nearly parallel to the surface of the substrate 10.

When the inclined portion 41 has the aforementioned configuration, the end portion 40A of the inner perimeter side of the seal member 40 is preferably arranged on the first inclined portion 41A or on the outside the first inclined portion 41A, and more preferably, on the outside the first inclined portion 41A.

That is, the end portion 40A of the inner perimeter side of the seal member 40 is preferably arranged on the second inclined portion 41B, or on the flat portion 41C. This is because when the inner perimeter side of the seal member 40 is located on the first inclined portion 41A having a large inclination angle, since the height of the seal member 40 becomes uneven depending on parts thereof, the interval between the substrate 10 and the substrate 20 is not kept constant, so that unevenness in display is likely to occur.

Furthermore, when the end portion 40B of the outer perimeter side of the seal member 40 is arranged on the face having a small inclination angle, unevenness in height of the seal member 40 can be eliminated. Therefore, the end portion 40B is preferably arranged on the second inclined portion 41B having a small inclination angle or in the region outside thereof. In order to increase the display region, the seal member 40 is preferably arranged at the outermost location as far as possible, and more preferably, the end portion 40B of the outer perimeter side of the seal member 40 is arranged on the flat portion 41C which is nearly parallel to the surface of the substrate 10.

As described above in detail, according to the configuration of the first embodiment of the present invention, since the organic film of the first substrate is arranged inside the end of the inner perimeter of the seal member provided on the periphery portion of the substrate, permeation of moisture from the outside is prevented, and degradation and peeling of the organic film can be prevented, so that the reflective liquid crystal display device, in which improvement of reliability is realized by a large degree, can be provided.

In particular, when the distance between the end of the outer perimeter side of the organic film and the end of the inner perimeter side of the seal member is specified to be 0 mm to 5 mm, the organic film can be separated from the outside air, so that degradation and peeling of the organic film can be prevented, while the area of the display region is ensured.

In addition, when the overcoat film covering the outer end of the organic film is formed, since the organic film is prevented from contacting with the outside air, peeling and degradation of the organic film can be further effectively prevented, so that the reflective liquid crystal display device having excellent display and high reliability can be provided.

Since the reflective liquid crystal display device according to the present invention has a configuration in which the color filters are formed on the reflective metal film, color shift and parallax can be reduced, and display having superior quality can be realized.

As described above, according to the first embodiment of the present invention, the reflective liquid crystal display device having high reliability and high display quality can be provided.

Figure 4:
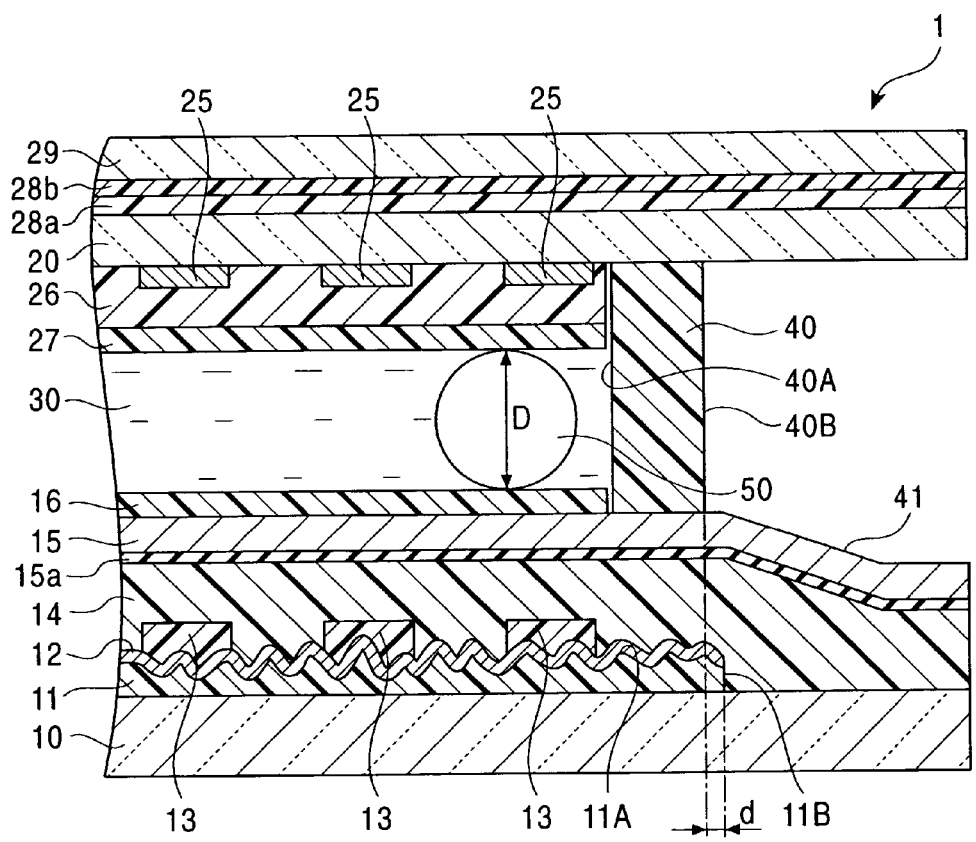
FIG. 4 is a partial sectional structure diagram of a reflective liquid crystal display device according to a second embodiment of the present invention.

FIG. 4 is a partial sectional structure diagram of a reflective liquid crystal display device 1 according to the second embodiment of the present invention. In FIG. 4, parts corresponding to those in FIG. 1 are indicated by the same reference numerals as in FIG. 1.

The reflective liquid crystal display 1 as shown in FIG. 4 has a configuration in which the first substrate 10 and the second substrate 20 are opposed to each other, and the liquid crystal layer 30 is enclosed with these two substrates 10 and 20 and the seal member 40 provided on the periphery portion of the faces, opposing to each other, of the substrates 10 and 20. The organic film 11, the reflective metal film 12, the color filters 13, the overcoat film 14, the electrode substrate film 15a, the electrode layers 15, and the orientation film 16 are formed in order by lamination on the liquid crystal 30 side surface of the first substrate 10.

On the other hand, the electrode layers 25, the overcoat film 26, and the orientation film 27 are formed in order by lamination on the liquid crystal layer 30 side surface of the second substrate 20, and on the reverse side thereof (that is, on the outer surface of the second substrate 20), the first phase difference plate 28a, the second phase difference plate 28b, and the polarizing plate 29 are formed in order by lamination.

A plurality of spacers 50 as shown in FIG. 4 are provided while being distributed in the liquid crystal layer 30 held between the first substrate 10 and the second substrate 20 in order to form the interval between the first substrate 10 and the second substrate 20 (more precisely, the interval between the orientation film 16 and the orientation film 27), and to keep the interval constant.

In the aforementioned structure, the region between the electrode layers 15 and the electrode layers 25 becomes the display region of the liquid crystal display device 1, and the region outside thereof becomes the non-display region.

As the first substrate 10 and the second substrate 20, transparent glass substrates are used preferably. However, when alkali contained in the glass substrate is eluted into the liquid crystal layer 30, the liquid crystal layer 30 is degraded so as to cause unevenness in color and faulty display. Therefore, it is preferable to use glass, for example, quartz glass and non-alkali glass, from which alkali is not eluted.

As the organic film 11, photosensitive resins, thermosetting resins, etc., are used, and the photosensitive resins, for example, acrylic resists, polystyrene resists, azide rubber resists, and imide resists, are used preferably.

Since many bumps and dips are formed on the surface 11A of the organic film 11, a light incident from the second substrate 20 side is reflected and scattered at the reflective metal film 12, so that the reflective liquid crystal display device 1 according to the present embodiment can exhibit excellent viewing angle property.

The film thickness of the organic film 11 is preferably within the range of 1 $\mu$m to 5 $\mu$m. When the film thickness is less than 1 $\mu$m, it is difficult to form a desired shape of bumps and dips on the organic film 11. When the film thickness exceeds 5 $\mu$m, unevenness in film thickness of the organic film 11 is likely to occur. Furthermore, when the film thickness of the organic film 11 is increased, adhesion property between the organic film 11 and the first substrate 10 is reduced. Therefore, in order to ensure the adhesion property and make the structure being not likely to peel, the film thickness of the organic film 11 is more preferably within the range of 1 $\mu$m to 3 $\mu$m.

FIG. 2 is an enlarged perspective diagram of a part including the organic film 11 and the reflective metal film 12. As is shown in the drawing, on the surface of the organic film 11, many concave portions 12A, the inner face of which is a part of a sphere, are sequentially formed while overlapping each other, and on the face thereof, the reflective metal film 12 is laminated.

It is desirable that depths of the concave portions 12A are made to be random values within the range of 0.1 $\mu$m to 3 $\mu$m, the adjacent concave portions 12A are arranged while pitches therebetween are made to be random values within the range of 5 $\mu$m to 100 $\mu$m, and inclination angles of inner faces of the concave portions 12A are specified to be within the range of −18 degrees to 18 degrees.

In particular, it is important that the distribution of the inclination angles of inner faces of the concave portions 12A is specified to be within the range of −18 degrees to 18 degrees, and the adjacent concave portions 12A are arranged while pitches therebetween are made to be random values with respect to all directions of the plane. The reason for this is that if the pitches between the adjacent concave portions 12A have regularity, an interference color is generated so as to cause a problem of coloring of the reflected light. When the distribution of the inclination angles of inner faces of the concave portions 12A is out of the range of −18 degrees to 18 degrees, since scattering angle of the reflected light is excessively increased, reflection intensity is reduced and well-lighted display cannot be achieved (since the scattering angle of the reflected light becomes 36 degrees or more in air, the reflection intensity peak in the liquid crystal display device is reduced, and the total reflection loss is increased).

If depths of the concave portions 12A exceed 3 μm, when the concave portions 12A are flattened in a later step, the crests of the convex portions cannot be completely buried in the flattening film (overcoat film 14), so that desired flatness cannot be achieved.

When the pitches between the adjacent concave portions 12A are less than 5 μm, since there is manufacturing constraint of a transfer mold used for forming the organic film 11, problems occur in that processing time is increased by a large degree, a shape sufficient for achieving desired reflection property cannot be formed, a coherent light is generated, etc. In practice, when a diamond indenter of 30 μm to 200 μm in diameter usable for manufacturing the aforementioned transfer mold is used, the pitches between the adjacent concave portions 12A are preferably 5 μm to 100 μm.

An embodiment of a method for forming the organic film 11 will be briefly explained below with reference to FIG. 3.

FIG. 3 is the diagram schematically showing the process for forming the organic film 11 in the reflective liquid crystal display device according to the present embodiment as shown in FIG. 4 with reference to the sectional configurations at steps A to D. The steps A to D are in the order in which the steps are performed.

In the step A, the coating of the photosensitive resin solution, for example, the acrylic resist, is applied on the first substrate 10 by the spin coat method, etc., and thereafter, pre-bake is performed so as to form the photosensitive resin layer 11a.

In the step B, the transfer mold 19 provided with the surface composed of the uneven surface 19a having a shape of bumps and dips and the flat surface 19b at the periphery portion of the uneven surface 19a is pressed against the surface of the photosensitive resin layer 11a so as to transfer the shape of the uneven surface 19a of the transfer mold 19 to the surface of the photosensitive resin layer 11a.

In the step C, on the reverse surface 10a side of the surface, on which the photosensitive resin layer 11a has been formed, of the first substrate 10, portions corresponding to the flat surface 19b at the periphery portion of the transfer mold 19 are covered with photomasks 18. Subsequently, a light 17, for example, an ultraviolet ray (g, h, and i-ray), is irradiated from the reverse surface 10a side of the first substrate so as to cure the photosensitive resin layer 11a.

In the step D, the photomasks 18 are removed from the first substrate 10, and the transfer mold 19 is removed from the photosensitive resin layer 11a. At this time, in the photosensitive resin layer 11a, since the portions corresponding to the flat portion 19b of the transfer mold 19 are not cured due to masking by the photomasks 18, these portions are removed together with the transfer mold 19 during the removal of the transfer mold 19.

Thereafter, development and pure water rinse are performed, and then, baking is performed with a heating device, for example, furnaces and hot plates.

By the aforementioned operations, the organic film 11 with the surface having a shape of bumps and dips is formed in the predetermined region on the first substrate 10.

As described above, by forming the organic film 11 on the region other than the periphery portion of the substrate 10, the organic film 11 including the end portion thereof can be covered with the overcoat film 14 which is formed later. Accompanying this, the organic film 11 is prevented from contacting with the outside air, so that degradation of the organic film 11 due to moisture can be prevented.

The reflective metal film 12 is provided in order to reflect and scatter the light incident into the liquid crystal layer 30 to achieve well-lighted display, and is formed on the surface 11A having a shape of bumps and dips of the organic film 11.

Regarding the reflective metal film 12, metallic materials having high reflectance, for example, Al and Ag, are used preferably, and the reflective metal film 12 can be formed from these metallic materials by a film forming method, for example, sputtering and vacuum evaporation.

Since the aforementioned metallic materials, for example, Al and Ag, do not always have excellent adhesion properties to the substrate 10 made of glass, when a part of this reflective metal film 12 is formed between the overcoat film 14 and the substrate 10, peeling of the film may be occurred.

Therefore, when the reflective metal film 12 is formed, it is preferable that the periphery portion of the substrate 10, on which the organic film 11 has not been formed, is covered with a mask member, and after the film is formed, removal treatment of the mask member is performed so as not to form a film of the aforementioned metallic material on the first substrate 10.

When the thickness of the reflective metal film 12 is excessively reduced, since coverage factor of the surface of the organic film 11 is reduced, the reflectance is reduced, and therefore, display is darkened. When excessively increased, peeling is likely to occur due to stress of the reflective metal film 12 itself, and in addition to this, film formation time of the reflective metal film 12 is increased and productivity is reduced. Therefore, the thickness of the reflective metal film 12 is preferably 200 to 2,000 angstroms, and more preferably, is 500 to 1,500 angstroms.

On the reflective metal film 12, color filters 13 for displaying each of colors of red, green, and blue are formed at intervals of about 10 μm. The color filters 13 are formed by, for example, performing the steps of coating the reflective metal film 12 with a resin, in which pigment is dispersed, exposing, and developing for each of the colors. Regarding the reflective liquid crystal display device 1 according to the present embodiment, since color shift and parallax can be prevented by formation of the color filters 13 immediately above the reflective metal film 12 as shown in FIG. 4, excellent display can be achieved.

When the film thickness of the color filter 13 is less than 0.3 μm, since purity of the color is reduced, reproducibility of the color is reduced. When the film thickness exceeds 1.5 μm, the transmission factor of the color filter 13 is reduced so as to darken the display. Therefore the film thickness of the color filter 13 is preferably 0.3 μm to 1.5 μm.

On the color filters 13, the overcoat film 14 covering the color filters 13, the organic film 11, and the substrate 10 is formed in order to flatten the bumps and dips of the film surface due to the organic film 11, the color filters 13, etc., formed on the substrate 10.

The overcoat film 14 is provided in order to improve the reliability of the liquid crystal display device by flattening the film surface, which has bumps and dips due to the shape of the surface 11A of the organic film 11 and the color filters 13 formed with intervals, to keep the interval between the first substrate 10 and the second substrate 20 constant, and to prevent unevenness in display, and in addition to this, by separating the organic film 11 from the outside air to prevent permeation of moisture from the outside air and to prevent peeling of the organic film 11.

The overcoat film 14 is preferably formed so as to cover at least an outer end portion 11B of the organic film 11. Accompanying this configuration, the organic film 11 can be prevented from directly contacting with the outside air, and as a consequence, degradation of the organic film 11 can be prevented.

Acrylic thermosetting resin, etc., can be used for the overcoat film 14, and in particular, resins having low hygroscopicity and low moisture permeability are preferably used.

The film thickness of the overcoat film 14 is preferably within the range of 1.5 μm to 5 μm. This is because when the film thickness is less than 1.5 μm, the bumps and dips of the surface due to the reflective metal film 12 and the color filters 13 cannot be sufficiently flattened, so that unevenness in display is likely to occur, and when the film thickness exceeds 5 μm, unevenness in film thickness of the overcoat film 14 and peeling are likely to occur.

Furthermore, in order to reduce the rate of rejection, due to faulty display and insufficient adhesion to adjacently formed films, to sufficiently low level, the film thickness of the overcoat film 14 is more preferably 2 μm to 3 μm.

The electrode layers 15 are formed by arranging many electrodes having a slip-like shape, in plan view, made of transparent conductive film, for example, ITO (Indium Tin Oxide), on the electrode substrate film 15a made of $SiO_2$, etc., formed on the overcoat film 14. These electrode layers 15 are provided as electrodes for driving the liquid crystal layer 30 by being connected to external driving circuits, although not shown in the drawing.

The electrode layers 25 are also formed by arranging many transparent electrodes having a slip-like shape, in plan view, and are connected to respective external driving circuits, in a manner similar to those in the electrode layers 15. The electrode layers 15 and the electrode layers 25 are arranged in directions perpendicular to each other, in plan view, so that the reflective liquid crystal display device 1 is made to be passive matrix type.

On the electrode layers 25 of the second substrate 20, in order to flatten the formed film surface and to keep the interval between the substrates 10 and 20 constituting the liquid crystal display device 1 constant, the overcoat film 26 covering the electrode layers 25 is formed.

As the material constituting the overcoat film 26, silicone resins, etc., are used preferably.

On the electrode layers 15 of the first substrate 10 and the overcoat film 26 of the second substrate 20, the orientation films 16 and 27 are formed, respectively. The orientation films 16 and 27 are provided in order to control orientation of liquid crystal molecules constituting the liquid crystal layer 30.

The orientation films 16 and 27 are formed by subjecting organic films made of polyimide resin, etc., to surface rubbing treatment after formation of the films. When the film thicknesses of the orientation films 16 and 27 are excessively reduced, these cannot endure the load during the rubbing treatment, and when excessively increased, propagation loss of light is increased, so that display is darkened. Therefore, the film thicknesses are preferably 100 to 1,000 angstroms, and more preferably, are 500 to 800 angstroms. Since the orientation films 16 and 27 contact with the liquid crystal layer 30, it is preferable that ion elution therefrom into the liquid crystal layer 30, etc., does not occur.

On the side opposite to the liquid crystal layer 30 side of the second substrate 20, that is, on the outer surface side of the substrate 20, the first phase difference plate 28a and the second phase difference plate 28b are provided in order. As these phase difference plates 28a and 28b, in general, films made of stretched macromolecular material, for example, polycarbonate, are used, although the optimum combination of materials, film thicknesses, etc., of the two phase difference plates 28a and 28b for electro-optical properties of the liquid crystal display device may be chosen.

In the case where at least two phase difference plates are laminated as in the reflective liquid crystal display device 1 according to the present embodiment, since wavelength dispersion property can be controlled with some degree of flexibility, it is possible to efficiently design with respect to increase in viewing angle and improvement of contrast.

On the second phase difference plate 28b, the polarizing plate 29 is provided in order to control polarization of the light incident into the liquid crystal layer 30 or the return light reflected by the reflective metal film 12. Since the polarizing plate 29 is located at the outermost surface in the reflective liquid crystal display device 1, in order to prevent the reduction of contrast due to the reflection by the surface, the polarization plate which has been subjected to antiglare treatment, non-reflection treatment, etc., is used preferably.

The seal member 40 is provided in the shape of a ring, in plan view, on the periphery portion of the first substrate 10 and the second substrate 20, and adheres both substrates in order to hold the liquid crystal layer 30 between both substrates. The seal member 40 is formed by the steps of printing the periphery portion of the substrate 10 or substrate 20 with a solution of a thermosetting resin or an ultraviolet curing resin, pressure-bonding both substrates at a predetermined location, and thereafter, performing heat treatment or ultraviolet ray irradiation treatment so as to cure. Furthermore, since the seal member 40 directly contacts with the liquid crystal layer 30, it is preferable that ion elution therefrom into the liquid crystal layer 30, etc., does not occur.

The spacers 50 are provided in order to keep the thickness of the liquid crystal layer 30 constant and to prevent unevenness in display, while being held between the orientation film 16 of the first substrate 10 and the orientation film 27 of the second substrate 20. The material and the dimensions of the spacers 50 can be appropriately optimized depending on design dimensions of a cell gap (the interval between the orientation film 16 and the orientation film 27) and the dimensions of the liquid crystal display device 1, although since the spacers are distributed in the liquid crystal layer 30 for use, it is preferable that there are no elution of ions, no interaction with the liquid crystal material, etc.

In the reflective liquid crystal display device 1 having the aforementioned configuration, regarding the relationship between locations of the seal member 40 and the organic film 11, which is a feature of the present embodiment, the outer end portion 11B of the organic film 11 is arranged in the region outside the outer end portion 40B of the seal member 40 by a distance d as shown in FIG. 4.

The reason for adoption of the aforementioned configuration in the reflective liquid crystal display device 1 according to the present embodiment is as described below.

Since the organic film 11 degrades and peels due to absorption of moisture, in order to prevent this, the aforementioned overcoat film 14 covering the outer end portion 11B of the organic film 11 is formed. However, since the organic film 11 is formed on the substrate 10 except for the periphery portion thereof, a height difference between the organic film 11 and the substrate 10 is generated at the periphery portion of the substrate 10. As shown in FIG. 4, since the overcoat film 14 surmounting the height difference is formed, regarding the surface of the electrode layers 15, the inclined portion 41 is formed at the portion corresponding to the location of the height difference.

In the periphery portion of the substrate 10 including the inclined portion 41, for example, when the seal member 40 is arranged outside the inclined portion 41 as shown in FIG. 4, the interval between the orientation film 16 and the orientation film 27 can be kept constant by the spacers 50, although the interval between the inclined portion 41 and the second substrate 20 becomes greater than that between the orientation film 16 and the orientation film 27.

As a consequence, when pressure is applied from above the second substrate 20 in the step of thermally curing the seal member 40, at the inclined portion 41 in the periphery portion of the substrates 10 and 20, the formation of the gap by the spacers 50 is not performed normally, and the second substrate 20 is distorted due to the applied pressure so as to cause unevenness in display.

On the other hand, in the reflective liquid crystal display device 1 according to the present embodiment, since the outer end portion 11B of the organic film 11 is arranged in the region outside the end portion 40B of the outer perimeter side of the seal member 40 as shown in FIG. 4, the seal member 40 is arranged on the flat surface inside the aforementioned inclined portion 41. Therefore, the cell gap formed by the spacers 50 as shown in FIG. 4 can be kept constant in the space surrounded by the seal member 40, so that high quality display without unevenness in display can be achieved.

Since the organic film 11 is formed on the substrate 10 except for the periphery portion thereof, and the overcoat film 14 covering the outer end portion 11B of the organic film 11 is formed, the overcoat film 14 interrupts moisture from the outside air, so that degradation and peeling of the organic film 11 can be prevented. Accompanying this, high reliability can be achieved.

The end portion 40B of the outer perimeter side of the seal member 40 and the outer end portion 11B of the organic film 11 are formed with the distance d as shown in FIG. 4. When the distance d is excessively reduced, flatness of the surface on which the seal member 40 is formed is reduced, and when excessively increased, a display region becomes small relative to the substrate. Therefore, the distance d is preferably within the range of 0.5 to 3 mm, and more preferably is within the range of 0.5 to 1.5 mm in order to ensure a larger display region.

As described above in detail, since the reflective liquid crystal display device according to the second embodiment of the present invention has a configuration in which the outer end of the organic film is arranged outside the end of the outer perimeter side of the seal member, the seal member can be formed on the flat surface above the organic film. Therefore, the cell gap, which is a thickness of the liquid crystal layer surrounded by the seal member, can be formed and kept at a constant interval, so that high quality display without unevenness in display can be achieved.

In the aforementioned reflective liquid crystal display device, when the organic film is formed in the region other than the periphery portion of the substrate, and the overcoat film covering the outer end of the organic film is formed, since the organic film and the outside air can be separated by the overcoat film, degradation and peeling of the organic film, due to moisture in the outside air, can be prevented, and the reflective liquid crystal display device having high reliability can be provided.

In particular, when the distance between the outer end of the organic film and the end of the outer perimeter side of the seal member is specified to be within the range of 0.5 mm to 3 mm, since moisture from the outside air can be sufficiently interrupted, and the region outside the seal member 40 can be reduced, the reflective liquid crystal display device having high reliability and a large display region can be provided.

When the aforementioned reflective liquid crystal display device has a configuration in which the color filters are formed on the surface of the reflective metal film, since color shift and parallax can be reduced, the reflective liquid crystal display device having superior display quality can be provided.

Figure 5:
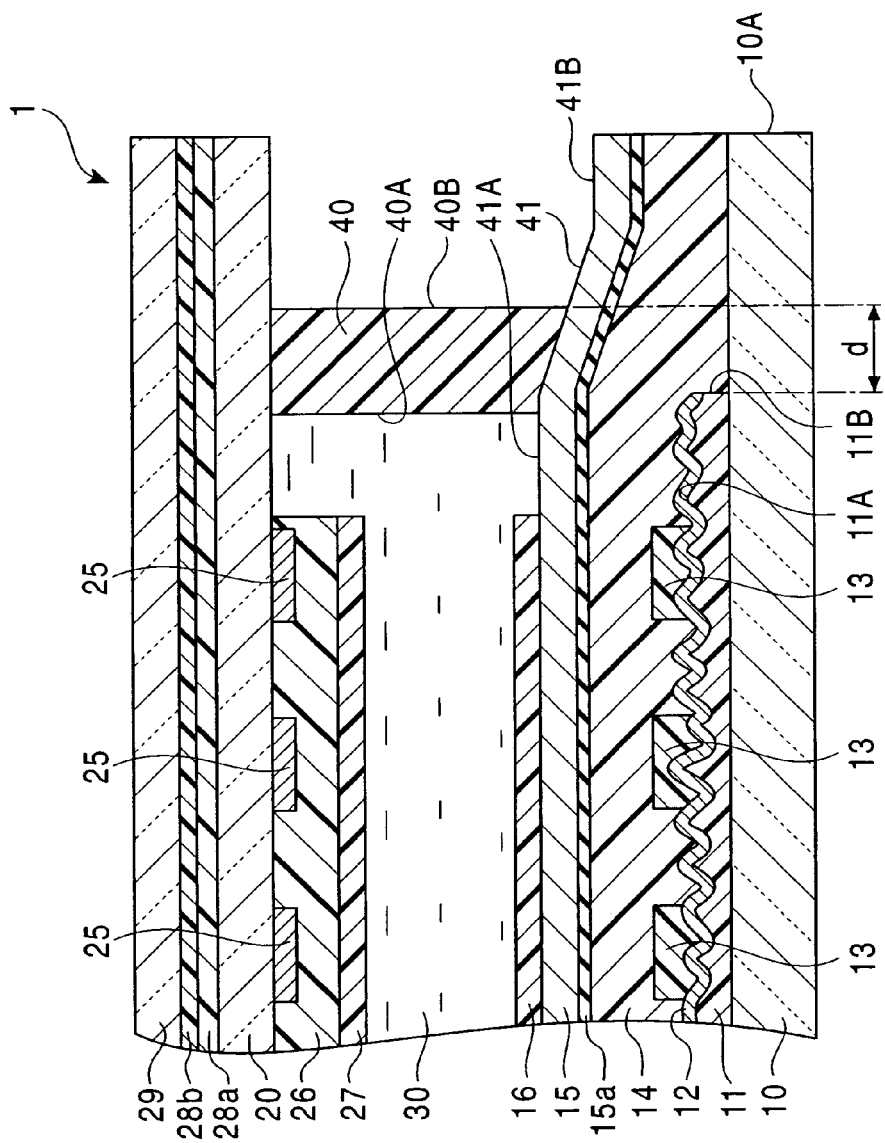
FIG. 5 is a partial sectional structure diagram of a reflective liquid crystal display device according to a third embodiment of the present invention.
Figure 6:
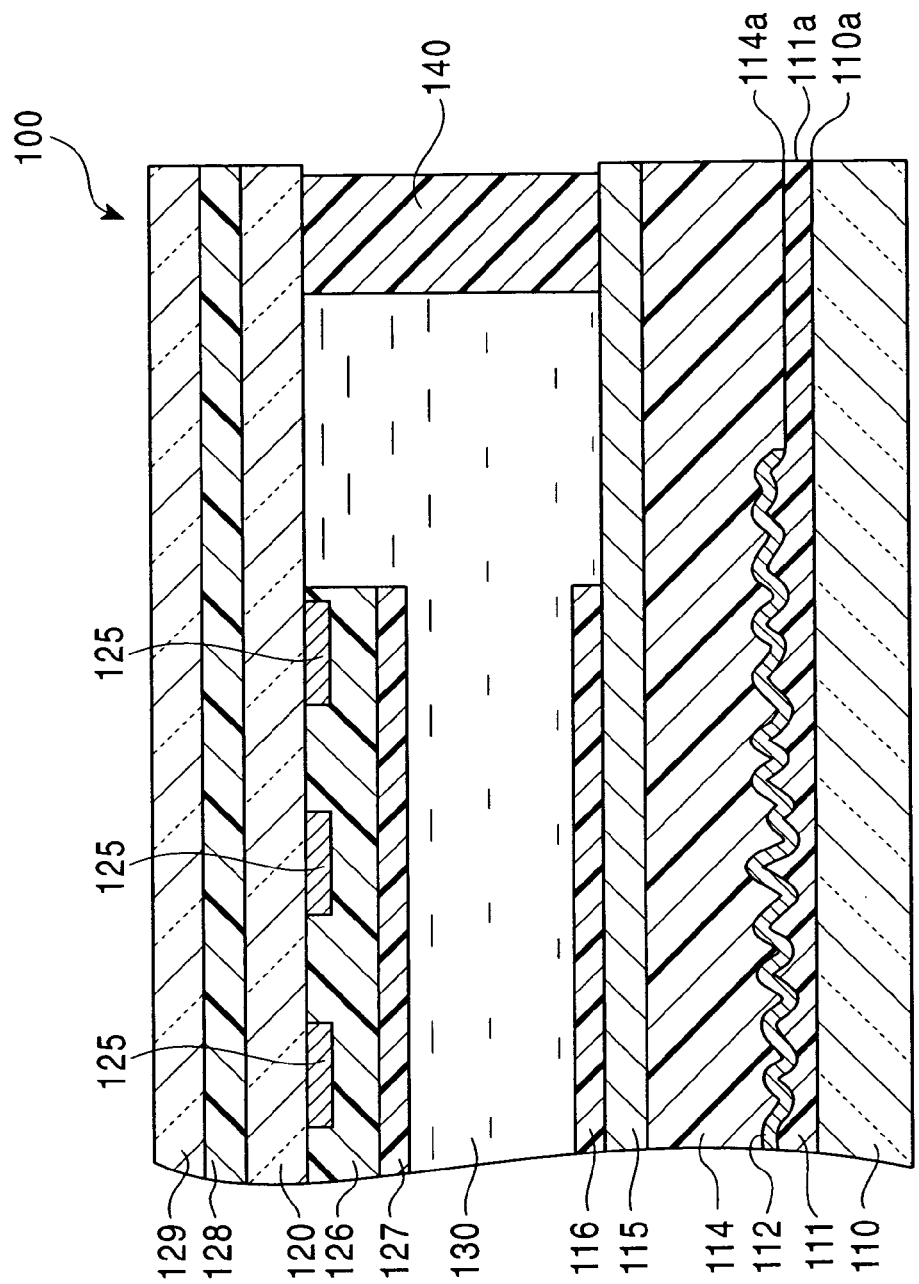
FIG. 6 is a partial sectional structure diagram of a conventional reflective liquid crystal display device.

FIG. 5 is a partial sectional structure diagram of a reflective liquid crystal display device 1 according to the third embodiment of the present invention. In FIG. 5, parts corresponding to those in FIG. 1 are indicated by the same reference numerals as in FIG. 1.

The reflective liquid crystal display 1 as shown in the drawing has a configuration in which the first substrate 10 and the second substrate 20 are opposed to each other, and the liquid crystal layer 30 is enclosed with these two substrates 10 and 20 and the seal member 40 provided on the periphery portion of the faces, opposing to each other, of the substrates 10 and 20. The organic film 11, the reflective metal film 12, the color filters 13, the overcoat film 14, the electrode substrate film 15a, the electrode layers 15, and the orientation film 16 are formed in order by lamination on the liquid crystal 30 side surface of the first substrate 10.

On the other hand, the electrode layers 25, the overcoat film 26, and the orientation film 27 are formed in order by lamination on the liquid crystal layer 30 side surface of the second substrate 20, and on the reverse side (that is, on the outer surface of the second substrate 20), the first phase difference plate 28a, the second phase difference plate 28b, and the polarizing plate 29 are formed in order by lamination.

As the first substrate 10 and the second substrate 20, transparent glass substrates are used preferably. However, when alkali contained in the glass substrate is eluted into the liquid crystal layer 30, the liquid crystal layer 30 is degraded so as to cause unevenness in color and faulty display. Therefore, it is preferable to use glass, for example, quartz glass and non-alkali glass, from which alkali is not eluted.

As the organic film 11, photosensitive resins, thermosetting resins, etc., are used, and the photosensitive resins, for example, acrylic resists, polystyrene resists, azide rubber resists, and imide resists, are used preferably.

Since many bumps and dips are formed on the surface 11A of the organic film 11, a light incident from the second substrate 20 side is reflected and scattered at the reflective metal film 12, so that the reflective liquid crystal display device 1 can exhibit excellent viewing angle property.

The film thickness of the organic film 11 is preferably within the range of 1 $\mu$m to 5 $\mu$m. When the film thickness is less than 1 $\mu$m, it is difficult to form a desired shape of bumps and dips on the organic film 11. When the film thickness exceeds 5 $\mu$m, unevenness in film thickness of the organic film 11 is likely to occur. Furthermore, when the film thickness of the organic film 11 is increased, adhesion property between the organic film 11 and the first substrate 10 is reduced. Therefore, in order to ensure the adhesion property and make the structure being not likely to peel, the film thickness of the organic film 11 is more preferably within the range of 1 $\mu$m to 3 $\mu$m.

The outer end portion 11B of the organic film 11 is preferably arranged in the region 0.5 mm to 1.8 mm inside the outer end of the substrate 10. When it is arranged outside, by more than 0.5 mm, the outer end of the substrate 10, moisture from the outside air cannot be sufficiently interrupted. When it is arranged inside, by more than 1.8 mm, the outer end of the substrate 10, the periphery portion of the substrate cannot be used efficiently.

FIG. 2 is an enlarged perspective diagram of a part including the organic film 11 and the reflective metal film 12. As is shown in the drawing, on the surface of the organic film 11, many concave portions 12A, inner face of which is a part of a sphere, are sequentially formed while overlapping each other, and on the face thereof, the reflective metal film 12 is laminated.

It is desirable that depths of the concave portions 12A are made to be random values within the range of 0.1 μm to 3 μm, the adjacent concave portions 12A are arranged while pitches therebetween are made to be random values within the range of 5 μm to 100 μm, and inclination angles of inner faces of the concave portions 12A are specified to be within the range of −18 degrees to 18 degrees.

In particular, it is important that the distribution of the inclination angles of inner faces of the concave portions 12A is specified to be within the range of −18 degrees to 18 degrees, and the adjacent concave portions 12A are arranged while pitches therebetween are made to be random values with respect to all directions of the plane. The reason for this is that if the pitches between the adjacent concave portions 12A have regularity, an interference color is generated so as to cause a problem of coloring of the reflected light. When the distribution of the inclination angles of inner faces of the concave portions 12A is out of the range of −18 degrees to 18 degrees, since scattering angle of the reflected light is excessively increased, reflection intensity is reduced and well-lighted display cannot be achieved (since the scattering angle of the reflected light becomes 36 degrees or more in air, the reflection intensity peak in the liquid crystal display device is reduced, and the total reflection loss is increased).

If depths of the concave portions 12A exceed 3 μm, when the concave portions 12A are flattened in a later step, the crests of the convex portions cannot be completely buried in the flattening film (overcoat film 14), so that desired flatness cannot be achieved.

When the pitches between the adjacent concave portions 12A are less than 5 μm, since there is manufacturing constraint of a transfer mold used for forming the organic film 11, problems occur in that processing time is increased by a large degree, a shape sufficient for achieving desired reflection property cannot be formed, a coherent light is generated, etc. In practice, when a diamond indenter of 30 μm to 200 μm in diameter usable for manufacturing the aforementioned transfer mold is used, the pitches between the adjacent concave portions 12A are preferably 5 μm to 100 μm.

An embodiment of a method for forming the organic film 11 will be briefly explained below with reference to FIG. 3.

FIG. 3 is a diagram schematically showing the process for forming the organic film 11 in the reflective liquid crystal display device according to the present embodiment as shown in FIG. 5 with reference to the sectional configurations at steps A to D. The steps A to D are in the order in which the steps are performed.

In the step A, the coating of the photosensitive resin solution, for example, the acrylic resist, is applied on the first substrate 10 by the spin coat method, etc., and thereafter, pre-bake is performed so as to form the photosensitive resin layer 11a.

In the step B, the transfer mold 19 provided with the surface composed of the uneven surface 19a having a shape of bumps and dips and the flat surface 19b at the periphery portion of the uneven surface 19a is pressed against the surface of the photosensitive resin layer 11a so as to transfer the shape of the uneven surface 19a of the transfer mold 19 to the surface of the photosensitive resin layer 11a.

In the step C, on the reverse surface 10a side of the surface, on which the photosensitive resin layer 11a has been formed, of the first substrate 10, portions corresponding to the flat surface 19b at the periphery portion of the transfer mold 19 are covered with photomasks 18. Subsequently, a light 17, for example, an ultraviolet ray (g, h, and i-ray), is irradiated from the reverse surface 10a side of the first substrate so as to cure the photosensitive resin layer 11a.

In the step D, the photomasks 18 are removed from the first substrate 10, and the transfer mold 19 is removed from the photosensitive resin layer 11a. At this time, in the photosensitive resin layer 11a, since the portions corresponding to the flat portion 19b of the transfer mold 19 are not cured due to masking by the photomasks 18, these portions are removed together with the transfer mold 19 during the removal of the transfer mold 19.

Thereafter, development and pure water rinse are performed, and then, baking is performed with a heating device, for example, furnaces and hot plates.

By the aforementioned operations, the organic film 11 with the surface having a shape of bumps and dips is formed in the predetermined region on the first substrate 10.

As described above, by forming the organic film 11 on the region other than the periphery portion of the substrate 10, the organic film 11 including the end portion thereof can be covered with the overcoat film 14 which is formed later. Accompanying this, the organic film 11 is prevented from contacting with the outside air, so that degradation of the organic film 11 due to moisture can be prevented.

The reflective metal film 12 is provided in order to reflect and scatter the light incident into the liquid crystal layer 30 to achieve well-lighted display, and is formed on the surface 11A having a shape of bumps and dips of the organic film 11.

Regarding the reflective metal film 12, metallic materials having high reflectance, for example, Al and Ag, are used preferably, and the reflective metal film 12 can be formed from these metallic materials by a film forming method, for example, sputtering and vacuum evaporation.

Since the aforementioned metallic materials, for example, Al and Ag, do not always have excellent adhesion properties to the substrate 10 made of glass, when a part of this reflective metal film 12 is formed between the overcoat film 14 and the substrate 10, peeling of the film may be occurred.

Therefore, when the reflective metal film 12 is formed, it is preferable that the periphery portion of the substrate 10, on which the organic film 11 has not been formed, is covered with a mask member, and after the film is formed, removal treatment of the mask member is performed so as not to form a film of the aforementioned metallic material on the first substrate 10.

When the thickness of the reflective metal film 12 is excessively reduced, since coverage factor of the surface of the organic film 11 is reduced, the reflectance is reduced, and therefore, display is darkened. When excessively increased, peeling is likely to occur due to stress of the reflective metal film 12 itself, and in addition to this, film formation time of the reflective metal film 12 is increased and productivity is reduced. Therefore, the thickness of the reflective metal film 12 is preferably 200 to 2,000 angstroms, and more preferably, is 500 to 1,500 angstroms.

On the reflective metal film 12, color filters 13 for displaying each of colors of red, green, and blue are formed at intervals of about 10 $\mu$m. The color filters 13 are formed by, for example, performing the steps of coating the reflective metal film 12 with a resin, in which pigment is dispersed, exposing, and developing for each of the colors. Regarding the reflective liquid crystal display device 1 according to the present embodiment, since color shift and parallax of the liquid crystal display device can be prevented by formation of the color filters 13 immediately above the reflective metal film 12 as shown in FIG. 5, high quality display can be achieved.

The film thickness of the color filter 13 is preferably about 0.3 $\mu$m to 1.5 $\mu$m. When the film thickness is less than 0.3 $\mu$m, since purity of the color is reduced, reproducibility of the color is reduced. When the film thickness exceeds 1.5 $\mu$m, the transmission factor of the color filter 13 is reduced so as to darken the display.

On the color filters 13, the overcoat film 14 covering the color filters 13, the organic film 11, and the substrate 10 is formed in order to flatten the bumps and dips of the film surface due to the organic film 11, the color filters 13, etc., formed on the substrate 10. The overcoat film 14 is provided in order to improve the reliability of the liquid crystal display device by flattening the film surface, which has a shape of bumps and dips due to the surface 11A of the organic film 11 and the color filters 13 formed with intervals, to keep the interval between the first substrate 10 and the second substrate 20 constant, and to prevent unevenness in display, and in addition to this, by separating the organic film 11 from the outside air to prevent permeation of moisture from the outside air and to prevent peeling of the organic film 11.

The overcoat film 14 is preferably formed so as to cover at least an outer end portion 11B of the organic film 11. Accompanying this configuration, the organic film 11 can be prevented from directly contacting with the outside air, and as a consequence, degradation of the organic film 11 can be prevented. Acrylic thermosetting resin, etc., can be used for the overcoat film 14, and in particular, resins having low hygroscopicity and low moisture permeability are preferably used.

The film thickness of the overcoat film 14 is preferably within the range of 1.5 $\mu$m to 5 $\mu$m. This is because when the film thickness is less than 1.5 $\mu$m, the bumps and dips of the surface due to the reflective metal film 12 and the color filters 13 cannot be sufficiently flattened, so that unevenness in display is likely to occur, and when the film thickness exceeds 5 $\mu$m, unevenness in film thickness of the overcoat film 14 and peeling are likely to occur.

Furthermore, in order to reduce the rate of rejection, due to faulty display and insufficient adhesion to adjacently formed films, to sufficiently low level, the film thickness of the overcoat film 14 is more preferably 2 $\mu$m to 3 $\mu$m.

The electrode layers 15 are formed by arranging many electrodes having a slip-like shape, in plan view, made of transparent conductive film, for example, ITO (Indium Tin Oxide), on the electrode substrate film 15a made of SiO$_2$, etc., formed on the overcoat film 14. These electrode layers 15 are provided as electrodes for driving the liquid crystal layer 30 by being connected to external driving circuits, although not shown in the drawing.

The electrode layers 25 are also formed by arranging many transparent electrodes having a slip-like shape, in plan view, and are connected to respective external driving circuits, in a manner similar to those in the electrode layers 15. The electrode layers 15 and the electrode layers 25 are arranged in directions perpendicular to each other, in plan view, so that the reflective liquid crystal display device 1 is made to be passive matrix type.

On the electrode layers 25 of the second substrate 20, in order to flatten the formed film surface and to keep the interval between the substrates 10 and 20 constituting the liquid crystal display device 1 constant, the overcoat film 26 covering the electrode layers 25 is formed.

As the material constituting the overcoat film 26, silicone resins, etc., are used preferably.

On the electrode layers 15 of the first substrate 10 and the overcoat film 26 of the second substrate 20, the orientation films 16 and 27 are formed, respectively. The orientation films 16 and 27 are provided in order to control orientation of liquid crystal molecules constituting the liquid crystal layer 30 in response to a voltage applied to the electrode layers 15 and 25.

The orientation films 16 and 27 are formed by subjecting organic films made of polyimide resin, etc., to surface rubbing treatment after formation of the films. When the film thicknesses of the orientation films 16 and 27 are excessively reduced, these cannot endure the load during the rubbing treatment, and when excessively increased, propagation loss of light is increased, so that display is darkened. Therefore, the film thicknesses are preferably 100 to 1,000 angstroms, and more preferably, are 500 to 800 angstroms. Since the orientation films 16 and 27 directly contact with the liquid crystal layer 30, it is preferable that ion elution therefrom into the liquid crystal layer 30, etc., does not occur.

On the side opposite to the liquid crystal layer 30 side of the second substrate 20, that is, on the outer surface side of the substrate 20, the first phase difference plate 28a and the second phase difference plate 28b are provided in order. As these phase difference plates 28a and 28b, in general, films made of stretched macromolecular material, for example, polycarbonate, are used, although the optimum combination of materials, film thicknesses, etc., of the two phase difference plates 28a and 28b for electro-optical properties of the liquid crystal display device may be chosen.

In the case where at least two phase difference plates are laminated as in the reflective liquid crystal display device 1 according to the present embodiment, since wavelength dispersion property can be controlled with some degree of flexibility, it is possible to efficiently design with respect to increase in viewing angle and improvement of contrast.

On the second phase difference plate 28b, the polarizing plate 29 is provided in order to control polarization of the light incident into the liquid crystal layer 30 or the return light reflected by the reflective metal film 12. Since the polarizing plate 29 is located at the outermost surface in the reflective liquid crystal display device 1, the polarization plate which has been subjected to antiglare treatment, non-reflection treatment, etc., is used preferably.

The seal member 40 is provided in the shape of a ring, in plan view, on the periphery portion of the first substrate 10 and the second substrate 20, and adheres both substrates in order to hold the liquid crystal layer 30 in the space between both substrates. The seal member 40 is formed by the steps of printing the periphery portion of the substrate 10 or substrate 20 with a solution of a thermosetting resin or an ultraviolet curing resin, pressure-bonding both substrates at a predetermined location, and thereafter, performing heat treatment or ultraviolet ray irradiation treatment so as to cure. Furthermore, since the seal member 40 directly contacts with the liquid crystal layer 30, it is preferable that ion elution therefrom into the liquid crystal layer 30, etc., does not occur.

The end portion 40A of the inner perimeter side of the seal member 40 is preferably arranged 1.2 mm to 2.0 mm inside the outer end portion 10A of the substrate 10. When the distance between the outer end portion 10A of the substrate 10 and the end portion 40A of the inner perimeter side of the seal member 40 is less than 1.2 mm, the region for providing the seal member 40 cannot be sufficiently ensured, so that sealing of the liquid crystal layer 30 becomes insufficient. When the distance exceeds 2.0 mm, the region outside the seal member 40 is increased, so that loss is increased.

Since the organic film 11 is formed on the region other than the periphery portion of the substrate 10, a height difference corresponding to the film thickness of the organic film 11 is formed at the outer end portion 11B of the organic film 11. In addition to this, since the overcoat film 14 surmounting the outer end portion 11B of the organic film 11 on the substrate 10 is formed, the inclined portion due to the aforementioned height difference is formed on the surface of the overcoat film 14.

As described above, since the electrode substrate film 15a and the electrode layers 15 are formed in order on the surface of the overcoat film 14 having the inclined portion, the inclined portion 41 is also formed, as shown in FIG. 5, on the surface of the electrode layers 15 joined to the seal member 40.

Both side regions of the inclined portion 41 are nearly parallel to the surface of the substrate 10. As shown in FIG. 5, the flat portion 41A inside the inclined portion 41 is located above the region in which the organic film 11 is formed, and the flat portion 41B outside the inclined portion 41 is located above the periphery region of the substrate 10 on which the organic film 11 is not formed.

In the reflective liquid crystal display device 1 according to the present embodiment as shown in FIG. 5, the end portion 40A of the inner perimeter side of the seal member 40 is arranged on the flat portion 41A inside at least the inclined portion 41, and the end portion 40B of the outer perimeter side of the seal member 40 is arranged on the inclined portion 41 or on the flat portion 41B outside the inclined portion 41. That is, the outer end portion 11B of the organic film 11 is arranged between the end portion 40A of the inner perimeter side of the seal member 40 and the end portion 40B of the outer perimeter side of the seal member 40.

In the reflective liquid crystal display device 1 according to the present embodiment in which the seal member 40 and the outer end portion 11B of the organic film 11 are arranged as described above, the end portion 40A of the inner perimeter side of the seal member 40 is arranged on the flat portion 41A. Accompanying this structure, since the inclined portion 41 is not included in the region surrounded by the seal member 40, the interval between the substrate 10 and the substrate 20 is not affected due to the inclined portion 41, and a constant interval can be formed. Therefore, the interval between the orientation film 16 and the orientation film 27 can be kept constant, so that unevenness in display is not likely to occur.

Furthermore, at the same time, since the end portion 40B of the outer perimeter side of the seal member 40 is located on the inclined portion 41 or on the flat portion 41B, the seal member 40 is arranged outside the outer end portion 11B of the organic film 11. That is, the seal member 40 is arranged between the organic film 11 and the outside air. As a consequence, the seal member 40, as well as the overcoat film 14, interrupts the permeation of moisture from the outside air into the organic film 11, so that degradation and peeling of the organic film 11 can be effectively prevented. Therefore, the reflective liquid crystal display device 1 according to the present embodiment does not adversely affect display even if it is used for a long term in a hot and humid environment (for example, temperature of 60° C. or more and humidity of 90% or more).

The end portion 40B of the outer perimeter side of the seal member 40 and the outer end portion 11B of the organic film 11 are arranged with the distance d therebetween as shown in FIG. 5. The distance d is preferably within the range of 0.3 mm to 0.8 mm.

When the distance d is less than 0.3 mm, since the effect of interrupting moisture by the seal member 40 becomes insufficient, the organic film may be degraded and peel off. When the distance d exceeds 0.8 mm, since the end portion 40A of the inner perimeter side of the seal member 40 gets on the inclined portion 41 formed due to the height difference between the organic film 11 and the substrate 10, unevenness in height of the seal member 40 occurs, and unevenness in interval (cell gap) between the substrate 10 and the substrate 20 occurs so as to cause unevenness in display.

As described above in detail, since the reflective liquid crystal display device according to the third embodiment of the present invention has a configuration in which the end of the outer perimeter side of the organic film formed on the substrate except for the periphery portion thereof is arranged inside the end of the outer perimeter side of the seal member provided on the periphery portion of the substrate, but outside the end of the inner perimeter side of the seal member, a constant cell gap can be formed by the inner perimeter side of the seal member and the organic film, and moisture in the outside air can be effectively separated by the outer perimeter side of the seal member.

Therefore, the reflective liquid crystal display device having superior display quality without unevenness in display, and having high reliability without degradation and peeling of the organic film can be provided.

By adopting the configuration in which the aforementioned overcoat film is formed so as to cover the end face of the aforementioned reflective metal film, the outside air and the organic film can be effectively separated, so that the reflective liquid crystal display device having further high reliability can be provided.

When the aforementioned reflective liquid crystal display device has a configuration in which the color filters are directly formed on the reflective metal film, since color shift and parallax can be prevented, the reflective liquid crystal display device having superior display quality can be provided.

As described above, according to the third embodiment of the present invention, the reflective liquid crystal display device having high reliability and high display quality can be provided.

What is claimed is:

1. A reflective liquid crystal display device, comprising:
   a liquid crystal layer enclosed with a pair of substrates arranged opposing to each other and a seal member provided on a periphery portion of the pair of substrates;
   at least an organic film, a reflective metal film, an overcoat film, an electrode layer, and an orientation film laminated on a liquid crystal layer side of one substrate of the pair of substrates; and wherein the organic film has an outer periphery end portion and the outer periphery end portion of the organic film is located in an inside portion of an inner perimeter side of the seal member provided on the periphery portion of the substrates in a plan view of the substrates.

2. The reflective liquid crystal display device according to claim 1, wherein the organic film is formed in a region 0 mm to 5 mm inside the end of the inner perimeter side of the seal member provided on the periphery portion of the substrates.

3. The reflective liquid crystal display device according to claim 1, wherein the end of the inner perimeter side of the seal member is arranged outside an inclined portion formed on a surface of the electrode layer by the overcoat film surmounting a height difference formed between the organic film and the one substrate.

4. The reflective liquid crystal display device according to claim 1, wherein the overcoat film is formed to cover an end of the organic film.

5. The reflective liquid crystal display device according to claim 1, wherein color filters are directly formed on the reflective metal film.

* * * * *